No. 794,254.

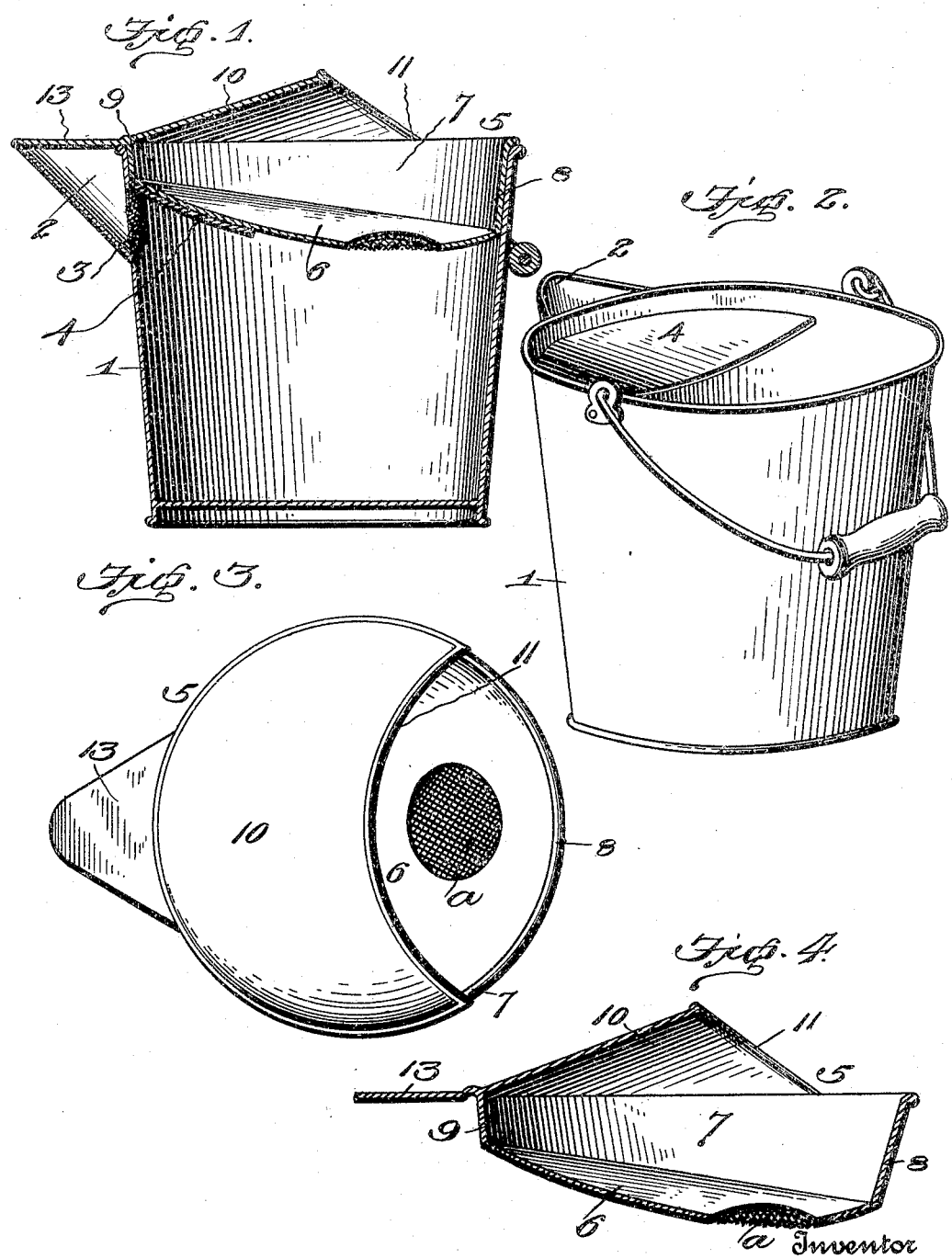

Patented July 11, 1905.

UNITED STATES PATENT OFFICE.

PHILIP H. SANGER, OF ONAWAY, MICHIGAN.

MILKING-PAIL.

SPECIFICATION forming part of Letters Patent No. 794,254, dated July 11, 1905.

Application filed September 26, 1904. Serial No. 226,042.

*To all whom it may concern:*

Be it known that I, PHILIP H. SANGER, a citizen of the United States, residing at Onaway, in the county of Presque Isle and State of Michigan, have invented certain new and useful Improvements in Milking-Pails; and I do declare the following to be a full, clear, and exact description of the invention, such as will enable others skilled in the art to which it appertains to make and use the same.

My invention relates to milking pails or buckets designed for the purpose of being used in milking cows; and one of the objects of the same is to provide a device for this purpose which will prevent dirt or foreign matter from getting into the milk during the milking operation.

Another object of my device is to provide means whereby the milk may be quickly strained after the bucket has been used in milking a cow.

These and other objects are attained by means of the construction illustrated in the accompanying drawings, in which—

Figure 1 is a central vertical section through a milking pail or bucket made in accordance with my invention. Fig. 2 is a perspective view of the milk-bucket with the strainer attachment removed. Fig. 3 is a plan view of the tray or strainer. Fig. 4 is a central vertical section through the same.

Referring to the drawings for a more particular description of my invention, the numeral 1 designates an outer pail, bucket, or receptacle provided with a discharge-spout 2, a wire-gauze strainer 3, and an inclined or curved deflector 4 within the receptacle immediately above the strainer at its central point and extending downward and around within the receptacle from this point.

5 is a tray or removable strainer, comprising a rounded bottom 6, having a wire-cloth strainer $a$ secured thereto at one side of the center near a side wall or rim 7, said rim being wider at one side 8 than at the other 9, and provided with a partial cover 10, having an opening 11 immediately above the strainer therein and a cover portion or extension 13 for the discharge nozzle or spout for the bucket or receptacle.

It will be noted that the rounded or inclined bottom 6 of the tray when said tray is in place in the bucket compels the milk to gather at the point at which it is strained to secure a thorough straining of each portion of the milk. The operation of my improved milk-bucket is as follows: The strainer or tray being placed within the bucket, the device is used as a milking-pail, and the cow is milked directly into the opening 11 in the partial cover 10 and immediately on the top of the strainer $a$, the milk naturally flowing by gravity to the more depressed portion surrounding said strainer $a$. The milk thus as it comes from the cow is kept clean, dirt not being permitted to enter the bucket or milking-pail. After the cow has been milked the tray may be removed and the milk poured out of the bucket into a pan or cooler, being again strained through the nozzle-strainer 3.

From the foregoing it will be obvious that my device is of a simple character, may be manufactured at slight cost, will result in clean milk from the time it leaves the cow until it has been placed in the cooler, and that the device can be readily cleaned.

Various changes in the form, proportion, and the minor details of construction may be resorted to without departing from the principle or sacrificing any of the advantages of the invention.

Having thus described my invention, what I claim, and desire to secure by Letters Patent, is—

A milking-bucket comprising a suitable receptacle having a discharge-spout, a strainer within the spout, a deflector within the receptacle extending above the strainer, a removable tray having a rounded or inclined bottom, a strainer at the lower portion of said bottom, a partial cover over the tray and having an opening immediately above the strainer and a cover for the discharge-spout, substantially as described.

In testimony whereof I have hereunto set my hand in presence of two subscribing witnesses.

PHILIP H. SANGER.

Witnesses:
SAMUEL S. TOWER,
N. G. TUCKER.